(12) United States Patent
Lee et al.

(10) Patent No.: US 8,606,402 B2
(45) Date of Patent: Dec. 10, 2013

(54) MANIPULATOR AND CONTROL METHOD THEREOF

(75) Inventors: Kwang Kyu Lee, Yongin-si (KR); Kyung Shik Roh, Seongnam-si (KR); Jong Do Choi, Suwon-si (KR); Kyung Won Moon, Seoul (KR); Ji Young Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 390 days.

(21) Appl. No.: 13/004,515

(22) Filed: Jan. 11, 2011

(65) Prior Publication Data

US 2011/0172819 A1 Jul. 14, 2011

(30) Foreign Application Priority Data

Jan. 14, 2010 (KR) ........................ 10-2010-0003519

(51) Int. Cl.
*B25J 9/02* (2006.01)
(52) U.S. Cl.
USPC .............................................. 700/253; 901/1
(58) Field of Classification Search
USPC .................. 700/245–255; 901/1–2, 9–16, 19, 901/27–36; 318/568.1, 611, 568.21, 318/568.24, 606, 615–623, 626
See application file for complete search history.

(56) References Cited

U.S. PATENT DOCUMENTS

| 5,355,743 A * | 10/1994 | Tesar .......................... 74/490.03 |
| 5,430,643 A * | 7/1995 | Seraji ............................ 700/263 |
| 6,304,050 B1 * | 10/2001 | Skaar et al. ............... 318/568.11 |

* cited by examiner

*Primary Examiner* — Dalena Tran
(74) *Attorney, Agent, or Firm* — Staas & Halsey LLP

(57) ABSTRACT

A manipulator, and a control method thereof, calculates a degree of freedom (DOF) used to prevent collision with an obstacle in consideration of an order of priority of DOFs for an operation and collision avoidance contribution. The manipulator judges whether there is danger of collision of the manipulator with an obstacle, judges whether or not there is at least one operating DOF capable of avoiding collision with the obstacle among the plurality of operating DOFs, upon judging that there is danger of collision with the obstacle, and avoids collision with the obstacle using at least one operating DOF having the lowest priority while performing the operation among the at least one operating DOF capable of avoiding collision with the obstacle, upon judging that there is the at least one operating DOF capable of avoiding collision with the obstacle.

16 Claims, 9 Drawing Sheets

MANIPULATOR AND CONTROL METHOD THEREOF

CROSS-REFERENCE TO RELATED APPLICATIONS

This application claims the priority benefit of Korean Patent Application No, 2010-0003519, filed on Jan. 14, 2010 in the Korean Intellectual Property Office, the disclosure of which is incorporated herein by reference.

BACKGROUND

1. Field

Embodiments relate to a manipulator which is capable of avoiding collision with an obstacle, and a control method thereof.

2. Description of the Related Art

As robots have been developed, the necessity of cooperation between robots or between a robot and a human is emphasized in an industrial robot field as well as in an intelligent service robot field. In an industrial robot, a multi-joint manipulator is formed in the shape of human hand and arm to provide movements of the hand and arm. The multi-joint manipulator includes plural links connected to each other. Connection portions of the plural links are referred to as joints, and movement characteristics of the manipulator are determined according to the geometric relationship between the links and the joints.

The most basic manipulator has 6 degrees of freedom (DOFs) of interactive configuration to completely control spatial position and direction of a tool mounted at the tip of the manipulator. Another manipulator has an additional 1 DOF provided at an elbow in addition to 6 operating DOFs, such as a human arm. The manipulator having 6 operating DOFs does not have a redundant DOF, and thus does not avoid collusion with an obstacle only through an internal motion, i.e., a motion of an elbow. However, the manipulator having 1 redundant DOF in addition to 6 operating DOFs is capable of avoiding collision with an obstacle through a motion of an elbow. That is, the 7-axis manipulator is capable of avoiding collision with an obstacle using the redundant DOF without damaging continuity in an operation, or stopping the operation, if the 7-axis manipulator does not avoid collision with the obstacle using the redundant DOF, and then is capable of avoiding collision with the obstacle using all of the operating DOFs and the redundant DOE

SUMMARY

Therefore, it is an aspect of the present embodiments to provide a manipulator which calculates a degree of freedom (DOF) used to prevent collision with an obstacle in consideration of an order of priority of DOFs for an operation and utility for collision avoidance, and a control method thereof.

Additional aspects will be set forth in part in the description which follows and, in part, will be obvious from the description, or may be learned by practice of the invention.

In accordance with one aspect, a control method of a manipulator, which has a plurality of operating degrees of freedom (DOFs) used in an operation, includes judging whether there is danger of collision of the manipulator with an obstacle, judging whether there is at least one operating DOF capable of avoiding collision with the obstacle among the plurality of operating DOFs, upon judging that there is danger of collision with the obstacle, and avoiding collision with the obstacle firstly using at least one operating DOF having the lowest priority while performing the operation among the at least one operating DOF capable of avoiding collision with the obstacle, upon judging that there is the at least one operating DOF capable of avoiding collision with the obstacle.

The manipulator may have at least one redundant DOF provided in addition to the operating DOFs, and the method may further include judging whether the manipulator is capable of avoiding collision with the obstacle using only the at least one redundant DOF, upon judging that there is danger of collision with the obstacle, and avoiding collision with the obstacle using only the at least one redundant DOF, upon judging that the manipulator is capable of avoiding collision with the obstacle using only the at least one redundant DOF.

The method may further include judging whether there is at least one operating DOF capable of avoiding collision with the obstacle among the plurality of operating DOFs, upon judging that the manipulator is not capable of avoiding collision with the obstacle using only the at least one redundant DOF, and then avoiding collision with the obstacle using the at least one operating DOF capable of avoiding collision with the obstacle.

The method may further include stopping the operation and avoiding collision with the obstacle using all of the operating DOFs and the at least one redundant DOF, upon judging that the manipulator is not capable of avoiding collision with the obstacle using only the at least one redundant DOF and upon judging that there is not at least one operating DOF capable of avoiding collision with the obstacle among the plurality of operating DOFs.

The avoidance of collision with the obstacle using the at least one operating DOF having the lowest priority while performing the operation among the at least one operating DOF capable of avoiding collision with the obstacle may include, if there is one operating DOF having the lowest priority while performing the operation among the at least one operating DOF capable of avoiding collision with the obstacle, avoiding collision with the obstacle using the operating DOF having the lowest priority.

The avoidance of collision with the obstacle using the at least one operating DOF having the lowest priority while performing the operation among the at least one operating DOF capable of avoiding collision with the obstacle may include, if there is a plurality of operating DOFs having the lowest priority while performing the operation among the at least one operating DOF capable of avoiding collision with the obstacle, avoiding collision with the obstacle firstly using an operating DOF having the highest collision avoidance contribution among the plurality of operating DOFs having the lowest priority.

The collision avoidance contribution may be obtained by calculating the shortest distance between the manipulator and the obstacle and judging a degree of increasing the shortest distance.

The judgment as to whether there is danger of the collision of the manipulator with the obstacle may include calculating absolute coordinates of joints of the manipulator, calculating a three-dimensional position coordinate of the obstacle, and judging whether or not the manipulator and the obstacle are located within a designated distance.

In accordance with another aspect, a manipulator, which has a plurality of operating degrees of freedom (DOFs) used in an operation and at least one redundant DOF provided in addition to the operating DOFs, includes a current position calculation unit to calculate angles of joints of the manipulator and to calculate absolute coordinates of the joints from the angles of the joints, a sensor unit to calculate a three-dimensional position coordinate of an obstacle around the manipulator, a collision danger calculation unit to judge whether there is danger of collision of the manipulator with the obstacle based on the absolute coordinates of the joints and the three-dimensional position coordinate of the obstacle, a collision avoidance DOF calculation unit to judge whether the manipulator is capable of avoiding collision with the obstacle using only the at least one redundant DOF, upon judging that there is danger of collision with the obstacle, to judge whether the manipulator is capable of avoiding collision with the obstacle using the operating DOFs, upon judging that the manipulator is not capable of avoiding collision with the obstacle using only the at least one redundant DOF, and to calculate at least one operating DOF having the lowest priority while performing the operation among at least one operating DOF capable of avoiding collision with the obstacle, upon judging that there is the at least one operating DOF capable of avoiding collision with the obstacle, and a joint control unit to control the joints so as to avoid collision with the obstacle using the calculated at least one operating DOF.

The collision avoidance DOF calculation unit, if there is one operating DOF having the lowest priority while performing the operation among the at least one operating DOF capable of avoiding collision with the obstacle, may avoid collision with the obstacle using the operating DOF having the lowest priority.

The collision avoidance DOF calculation unit, if there is a plurality of operating DOFs having the lowest priority while performing the operation among the at least one operating DOF capable of avoiding collision with the obstacle, may avoid collision with the obstacle firstly using an operating DOF having the highest collision avoidance contribution among the plurality of operating DOFs having the lowest priority.

The collision avoidance DOF calculation unit may calculate the DOF having the highest collision avoidance contribution among the plurality of operating DOFs having the lowest priority by calculating the shortest distance between the manipulator and the obstacle and judging a degree of increasing the shortest distance.

The collision avoidance DOF calculation unit may set all of the operating DOFs and the at least one redundant DOF as DOFs to avoid collision with the obstacle, upon judging that the manipulator is not capable of avoiding collision with the obstacle using only the at least one redundant DOF and upon judging that there is not at least one operating DOF capable of avoiding collision with the obstacle among the plurality of operating DOFs.

In another aspect, a control method of a manipulator having a plurality of operating degrees of freedom (DOFs) used in an operation includes avoiding collision of the manipulator with an obstacle using at least one operating DOF having a lowest priority among the operating DOFs capable of avoiding collision with the obstacle while performing the operation.

In a further aspect, at least one non-transitory computer-readable medium stores computer-readable instructions to control at least one processor to a control method of a manipulator having a plurality of operating degrees of freedom (DOFs) used in an operation includes avoiding collision of the manipulator with an obstacle using at least one operating DOF having a lowest priority among the operating DOFs capable of avoiding collision with the obstacle while performing the operation.

In another aspect, a manipulator having a plurality of operating degrees of freedom (DOFs) used in an operation includes a calculating unit determining at least one operating DOF having a lowest priority among the operating DOFs capable of avoiding collision of the manipulator with an obstacle while performing the operation.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
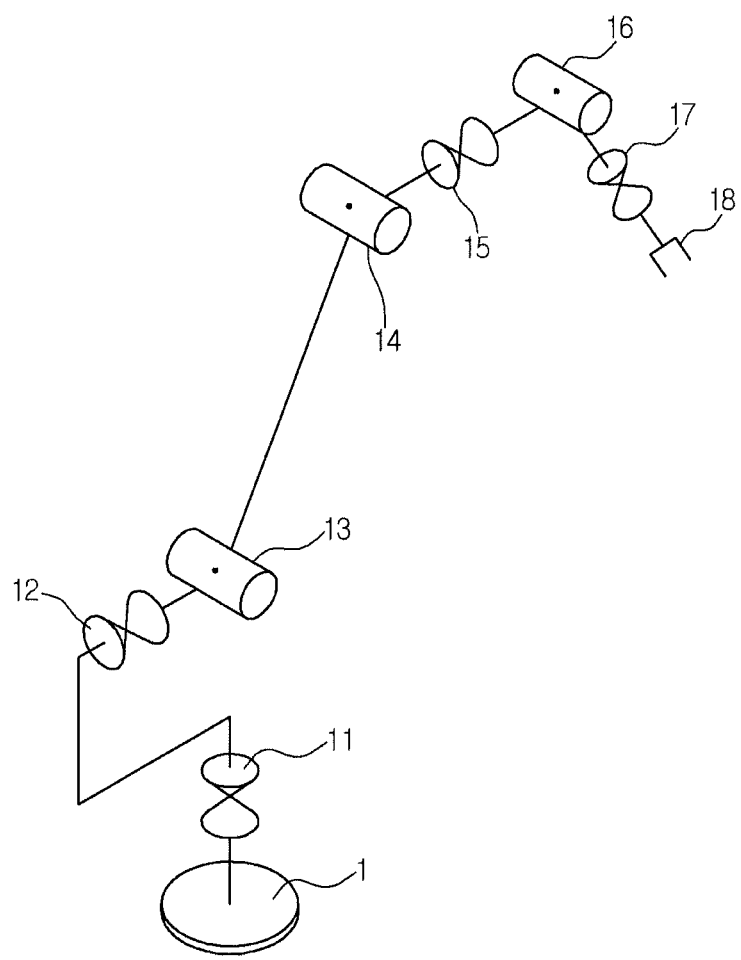
FIG. 1 is a view illustrating a 7-axis manipulator having 7 DOFs in accordance with one embodiment.

Reference will now be made in detail to the embodiments, examples of which are illustrated in the accompanying drawings, wherein like reference numerals refer to the like elements throughout.

FIG. 1 is a view illustrating a 7-axis manipulator having 7 DOFs in accordance with one embodiment.

A manipulator 1 in accordance with this embodiment is formed, for example, in a shape of human hand and arm, and thus has 7 DOFs. The manipulator 1 includes 7 joints 11~17, and an operating hand 18. Here, reference numerals 11, 12, 15, and 17 are rotating axes, and reference numerals 13, 14, and 16 are used as bending axes. In this embodiment, reference numeral 14 represents an elbow joint.

Figure 2:
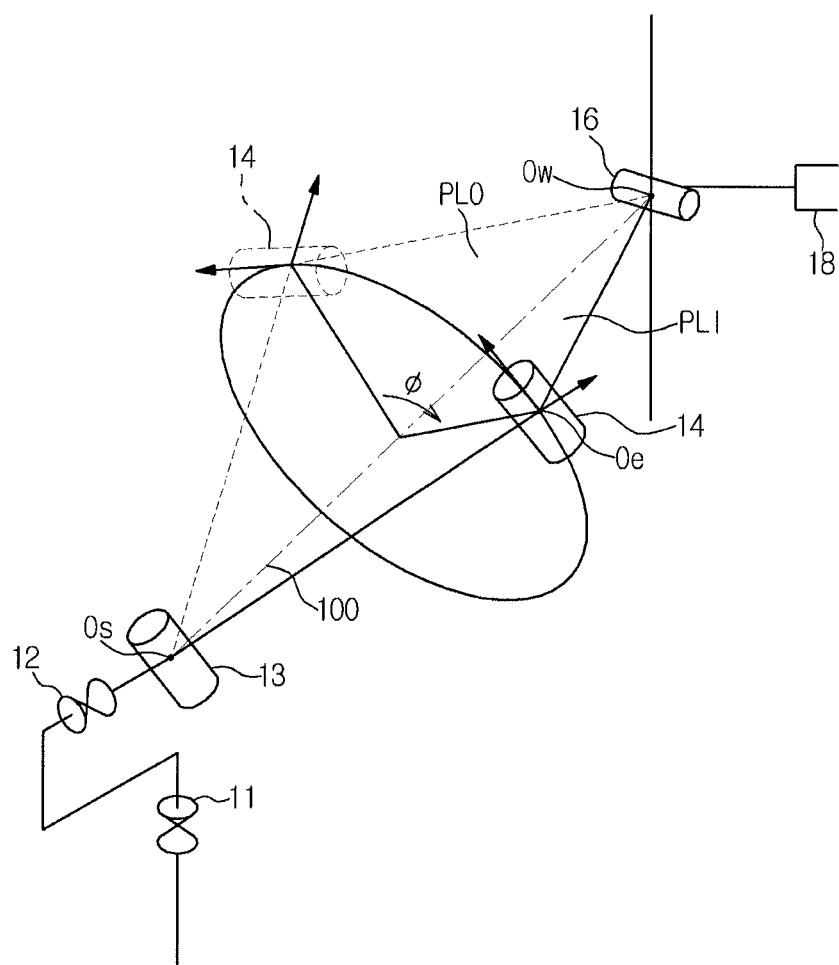
FIG. 2 is a view illustrating a motion of an elbow joint which is a redundant DOF of the manipulator of FIG. 1.

FIG. 2 is a view illustrating an operation of the elbow joint 14 which is a redundant DOF of the manipulator of FIG. 1.

Although the elbow joint 14 may be rotated around a line 100 connecting a shoulder point Os represented by reference numeral 13 in FIG. 1 and a wrist point Ow represented by reference numeral 16 in FIG. 1, position and posture of the operating hand 18 of the manipulator 1 are not changed. That is, a position of the elbow joint 14 may be changed under the condition that position and posture of the operating hand 18 are fixed. A joint angle Ø of the elbow joint 14 may be defined as an angle formed by a plane PL0 passing through the line 100 connecting the wrist point Ow and the shoulder point Os and perpendicular to the x-y plane and a plane PL1 passing through the wrist point Ow, the shoulder point Os, and a shoulder point Oe.

Figure 3:
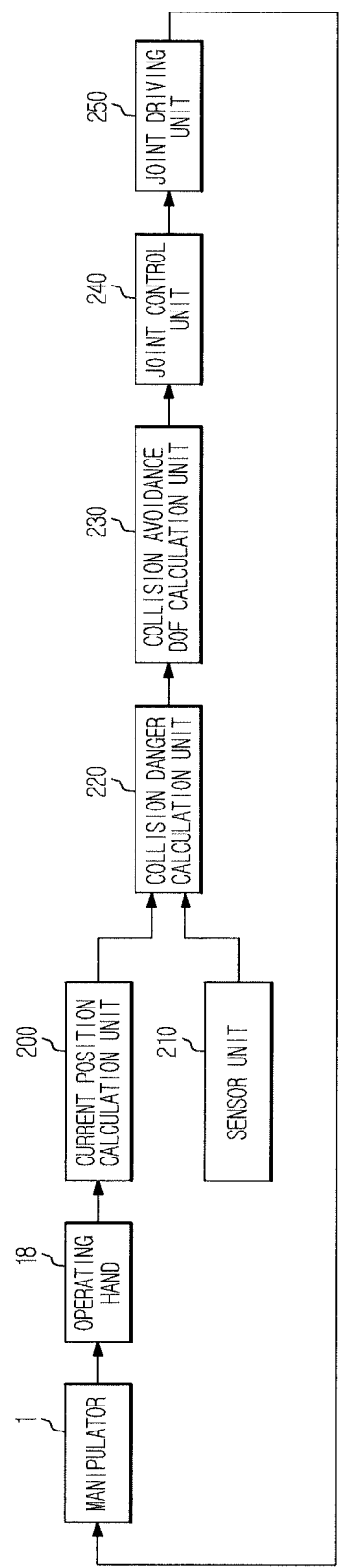
FIG. 3 is a control block diagram of the manipulator of FIG. 1.
Figure 4:
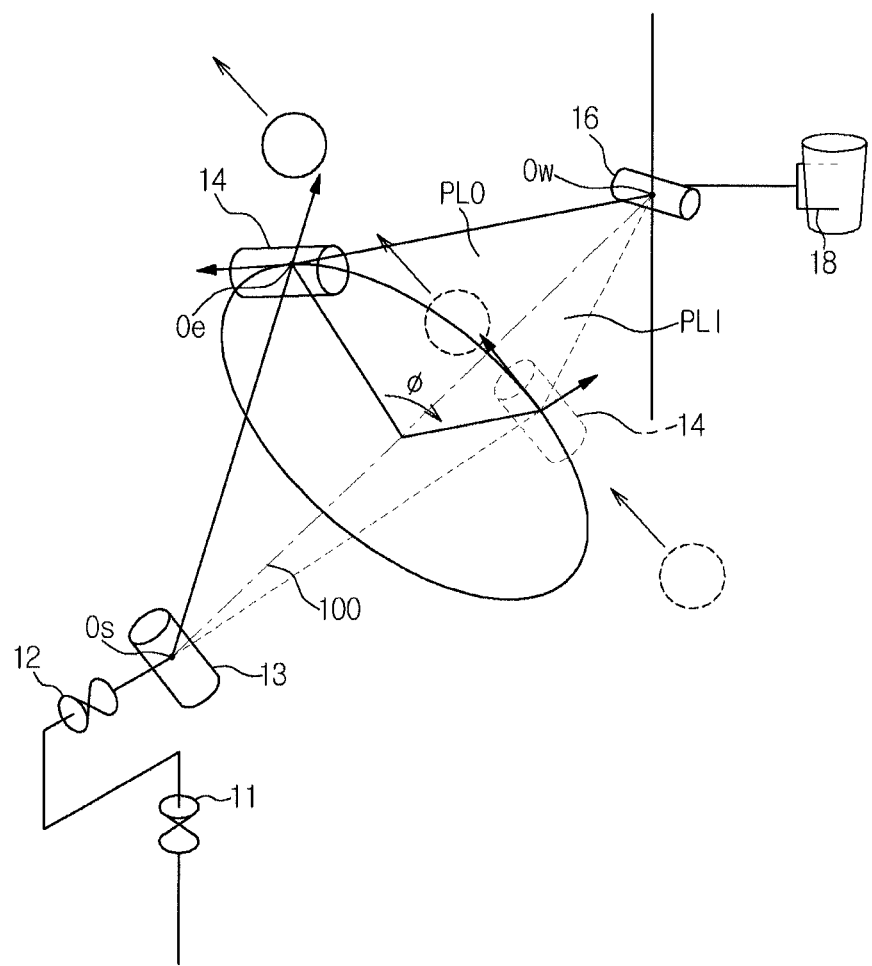
FIG. 4 is a view illustrating an operation of the manipulator of FIG. 1 to avoid collision with an obstacle using the redundant DOF of the manipulator of FIG. 1.

FIG. 3 is a control block diagram of the manipulator of FIG. 1, and FIG. 4 is a view illustrating an operation of the manipulator of FIG. 1 to avoid collision with an obstacle using the redundant DOF.

Figure 5A:
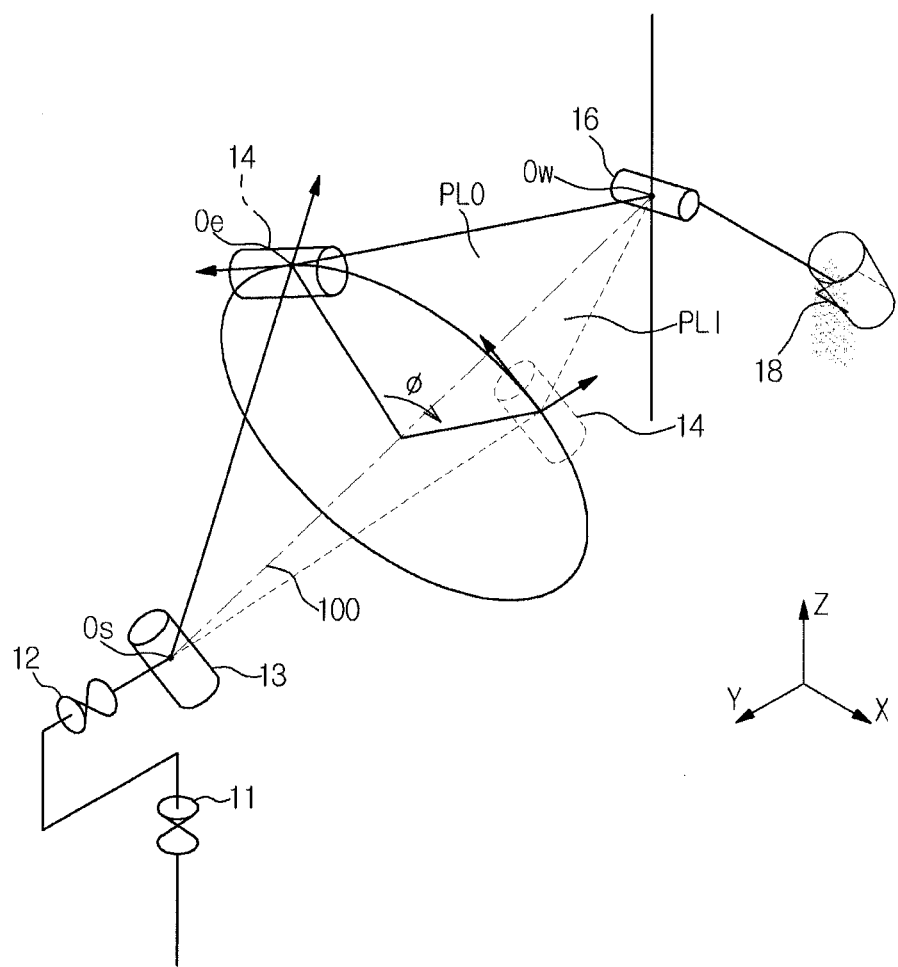
FIGS. 5A and 5B are views illustrating an order of priority of operating DOFs to avoid collision while performing an operation of carrying a cup in the manipulator of FIG. 1.
Figure 5B:
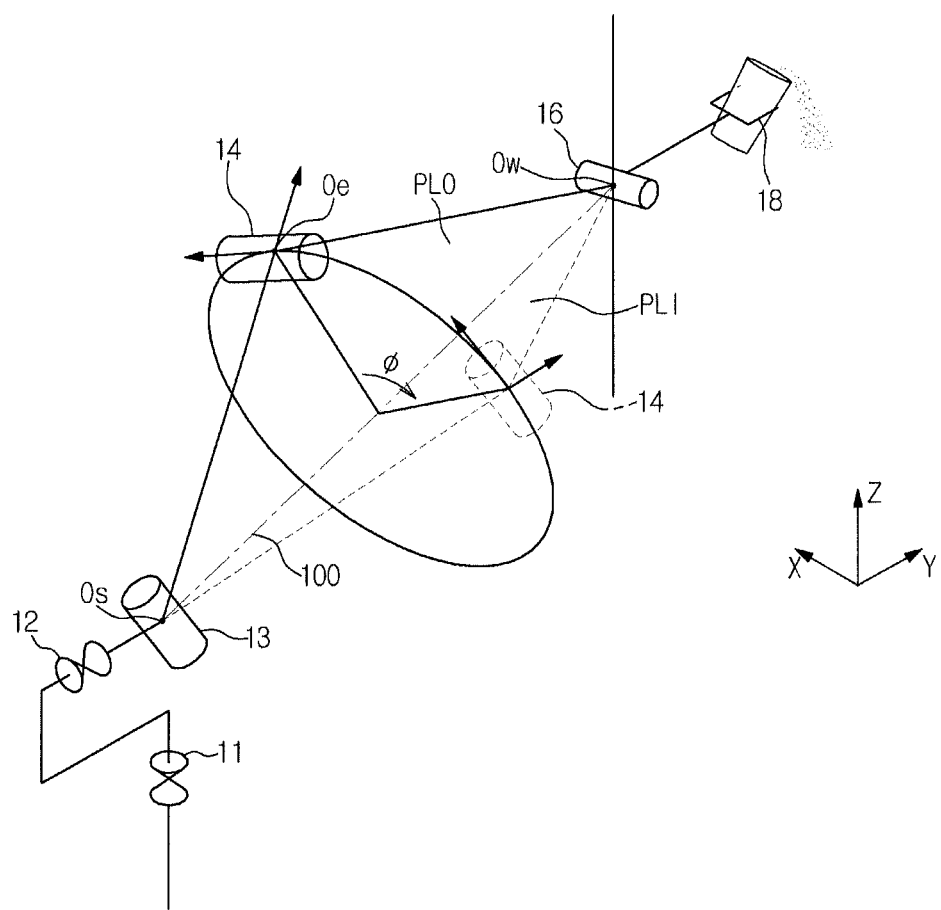
Figure 6A:
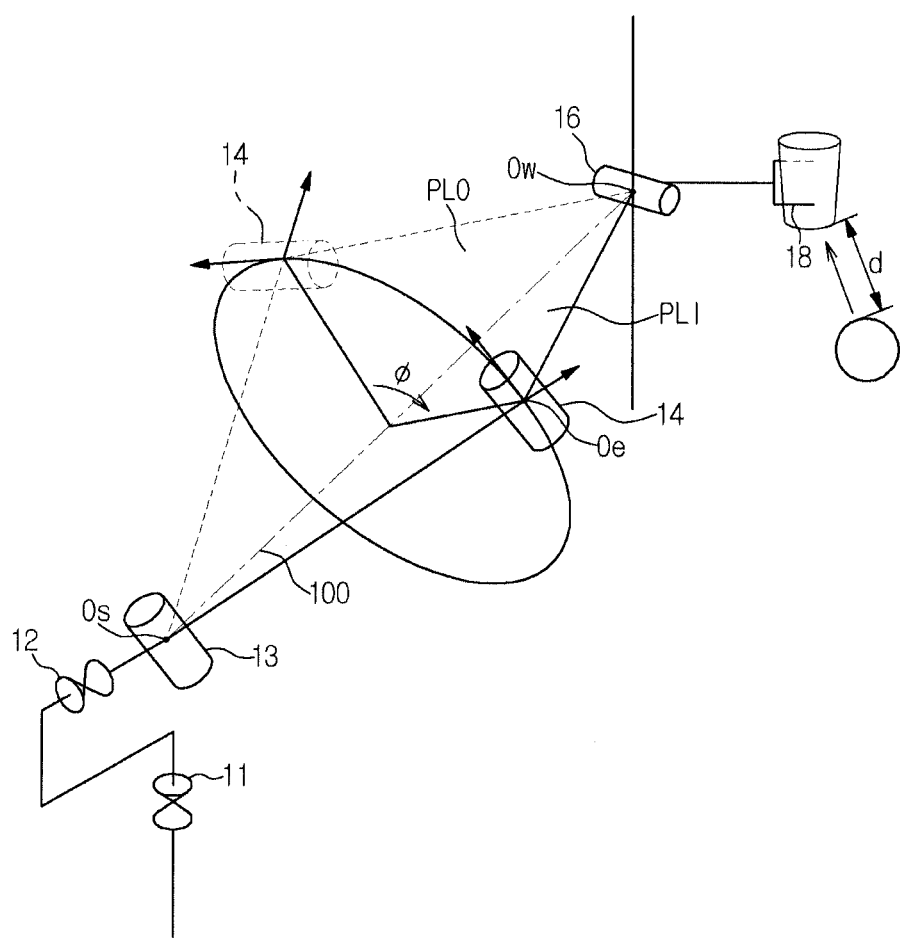
FIGS. 6A and 6B are views illustrating a method of avoiding collision with an obstacle using only some of operating DOFs.
Figure 6B:
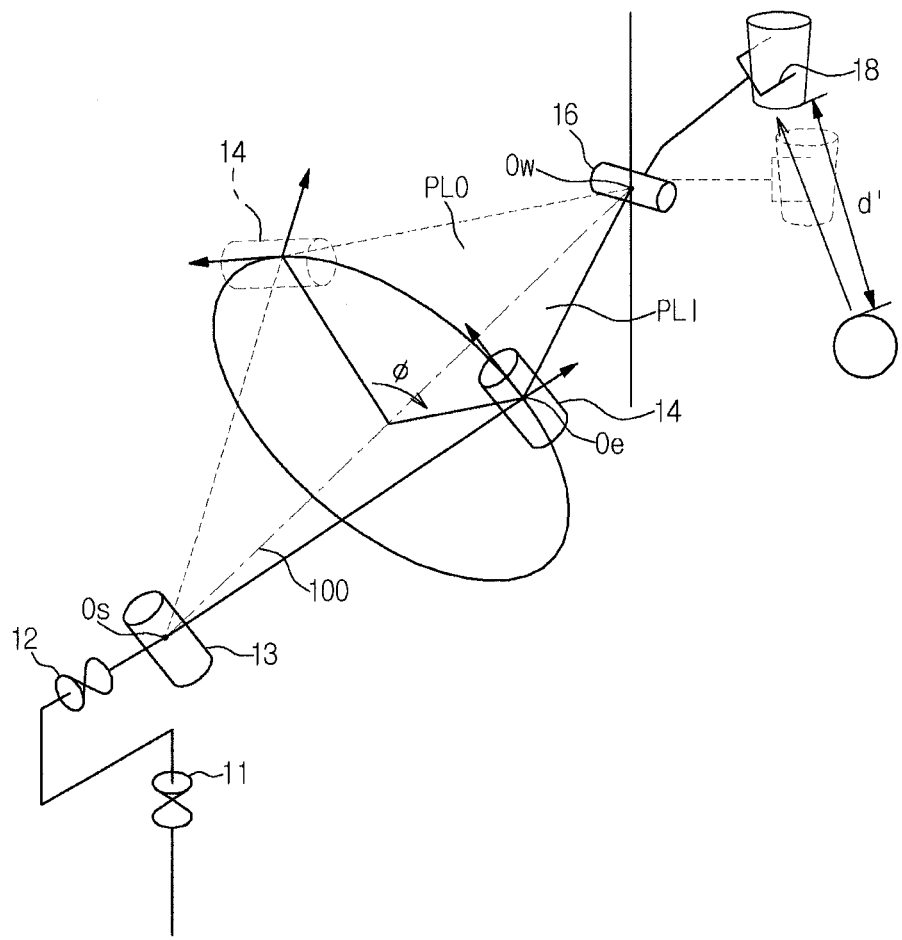

FIGS. 5A and 5B are views illustrating an order of priority of operating DOFs to avoid collision while performing an operation of carrying a cup in the manipulator of FIG. 1, and FIGS. 6A and 6B are views illustrating a method of avoiding collision with an obstacle using only some of operating DOFs.

As shown in FIG. 3, the manipulator 1 may include a current position calculation unit 200, a sensor unit 210, collision danger calculation unit 220, collision avoidance DOF calculation unit 230, a joint control unit 240, and a joint driving unit 250.

The current position calculation unit 200 calculates current positions of the respective joints and the operating hand 18 of the manipulator 1. The current position calculation unit 200 calculates joint angles of the manipulator 1 using speed sensors, such as, for example, tachometers, and calculates absolute coordinate positions of the respective joints from the calculated joint angles.

The sensor unit 210 senses an obstacle around the manipulator 1. The sensor unit 210 may include a camera to obtain image data, and a sensor unit controller to obtain three-dimensional position data of the obstacle based on the image data.

The collision danger calculation unit 220 judges whether or not there is danger (or risk) of collision of the manipulator 1 with the obstacle based on combination of the absolute coordinate positions of the respective joints and the operating hand 18 of the manipulator 1 transmitted from the current position calculation unit 200 and the three-dimensional position data of the obstacle transmitted from the sensor unit 210. The collision danger calculation unit 220 judges that there is danger (or risk) of collision of the manipulator 1 with the obstacle, if it is judged that an obstacle is located within a designated distance in a traveling direction of the manipulator 1 or if it is judged that the obstacle approaches the manipulator 1 and the manipulator 1 and the obstacle are located within a designated distance.

The collision avoidance DOF calculation unit 230 calculates DOFs capable of avoiding collision with the obstacle. The collision avoidance DOF calculation unit 230 judges whether or not the manipulator 1 is capable of avoiding collision with the obstacle using only the redundant DOF other than the operating DOFs, if it is judged that there is danger (or risk) of collision of the manipulator 1 with the obstacle. The operating DOFs mean DOFs designed to be used in an operation, and the redundant DOF means an additional DOF other than the operating DOFs. For example, on the assumption that the operating hand 18 of the manipulator 1 having 7 DOFs holds a cup and an obstacle is approaching the manipulator 1, the collision avoidance DOF calculation unit 230 judges whether or not the manipulator 1 is capable of avoiding collision with the obstacle using the redundant DOF based on the three-dimensional position data of the obstacle obtained by the sensor unit 210 and the absolute coordinate position data of the respective joints calculated by the current position calculation unit 200. That is, the collision avoidance DOF calculation unit 230 judges whether or not the manipulator 1 is capable of avoiding the obstacle by rotating the elbow joint 14, which is the redundant DOF, around the line 100 connecting the shoulder point Os and the wrist point Ow. The collision avoidance DOF calculation unit 230 judges whether or not the manipulator 1 is capable of avoiding the obstacle using a rotating angle and a rotating radius of the elbow joint 14, which is the redundant DOF, based on the data of the respective joints of the manipulator 1 transmitted from the current position calculation unit 200. With reference to FIG. 4, it is understood that the manipulator 1 is capable of avoiding the obstacle by moving only the wrist joint 14, which is the redundant DOF.

The collision avoidance DOF calculation unit 230 judges whether or not the manipulator 1 is capable of avoiding collision with the obstacle using the operating DOFs, if it is judged that the manipulator 1 is not capable of avoiding collision with the obstacle using only the redundant DOF without using the operating DOFs. When the manipulator 1 performs an operation, use of all the operating DOFs is not required, but there may be an order of priority among the operating DOFs. With reference to FIGS. 5A and 5B, when the manipulator 1 performs an operation of carrying a cup, in order to prevent spilling of water from the cup, the operating hand 18 does not perform rotation around the x-axis and rotation around the y-axis. Therefore, DOFs regarding rotation around the x-axis and rotation around the y-axis have the highest priority, and DOFs regarding movements in the directions of the x-axis, the y-axis, and the z-axis and rotation around the z-axis have a relatively low priority. The collision avoidance DOF calculation unit 230 sets a DOF having a low priority to be a DOF capable of avoiding collision with the obstacle. Here, the order of priority is set by a designer when operations of the manipulator 1 are designed.

Further, the collision avoidance DOF calculation unit 230 calculates a DOF or DOFs having the lowest priority among the operating DOFs, if the manipulator 1 avoids collision with the obstacle using some DOFs among the operating DOFs.

If there is one DOF having the lowest priority among the operating DOFs, the collision avoidance DOF calculation unit 230 sets the DOF having the lowest priority to be a DOF capable of avoiding collision with the obstacle.

If there are plural DOFs having the lowest priority among the operating DOFs, the collision avoidance DOF calculation unit 230 calculates a DOF having the highest collision avoidance contribution among the plural DOFs having the lowest priority so as to avoid collision with the obstacle. Hereinafter, a method of calculating collision avoidance contribution will be described.

The collision avoidance DOF calculation unit 230 obtains an objective function h(q) by squaring the shortest distance d from the manipulator 1 to the obstacle, as Equation 1 below.

$$h(q) = d^2(q) \qquad \text{Equation 1}$$

In Equation 1, d(q) is a distance function expressed by the joint angle of each joint of the manipulator 1, h(q) is an objective function representing the shortest distance from the manipulator 1 to the obstacle, and q is a vector representing the angle of each joint of the manipulator 1, and has components, as shown in Equation 2 below, if the manipulator 1 has 6 DOFs.

$$q = [q1\ q2\ q3\ q4\ q5\ q6] \qquad \text{Equation 2}$$

The collision avoidance DOF calculation unit 230 calculates a gradient of the objective function h(q) of Equation 1. The gradient of the objective function h(q) is obtained by Equation 3 below, and means a direction in which the shortest distance between the manipulator 1 and the obstacle in a joint space increases. That is, the calculation of the gradient of objective function h(q) may be the most effective method to avoid collision with the obstacle.

$$\nabla h(q) = \frac{\partial h}{\partial q} \qquad \text{Equation 3}$$

The collision avoidance DOF calculation unit 230 calculates a unit vector r in the direction of $\nabla h(q)$. The unit vector r is calculated by Equation 4 below. Here, the unit vector 4 is a vector defined in the joint space.

$$r = \frac{\nabla h(q)}{\|\nabla h(q)\|} \quad \text{Equation 4}$$

The collision avoidance DOF calculation unit 230 calculates a unit vector in the joint space corresponding to each DOF (for example, a DOF to move in the direction of the x-axis). For example, a unit vector in the joint space corresponding to the DOF to move in the direction of the x-axis will be calculated.

When in a Jacobian matrix, a row vector $\dot{x}$ corresponding to the direction of the x-axis is deleted and singular value decomposition (SVD) of the Jacobian matrix, from which the row vector $\dot{x}$ is deleted, is carried out, the final column vector in a V matrix becomes the unit vector in the joint space corresponding to the direction of the x-axis. The singular value decomposition of the Jacobian matrix is carried out by Equation 5 below.

$$J = USV^T \quad \text{Equation 5}$$

The known differential kinematics are obtained by Equation 6 below.

$$\underbrace{\begin{bmatrix} \dot{x} \\ \dot{y} \\ \dot{z} \\ w_x \\ w_y \\ w_z \end{bmatrix}}_{\dot{x}} = \underbrace{\begin{bmatrix} u_x \\ u_y \\ u_z \\ u_{o_x} \\ u_{o_y} \\ u_{o_z} \end{bmatrix}}_{U} \underbrace{\begin{bmatrix} s_x & 0 & 0 & 0 & 0 & 0 \\ 0 & s_y & 0 & 0 & 0 & 0 \\ 0 & 0 & s_z & 0 & 0 & 0 \\ 0 & 0 & 0 & s_{o_x} & 0 & 0 \\ 0 & 0 & 0 & 0 & s_{o_y} & 0 \\ 0 & 0 & 0 & 0 & 0 & s_{o_z} \end{bmatrix}}_{S} \cdot \quad \text{Equation 6}$$

$$\underbrace{[v_1 \ v_2 \ v_3 \ v_4 \ v_5 \ v_6]}_{V^T} \cdot \dot{q} = \begin{bmatrix} u_x \\ u_y \\ u_z \\ u_{o_x} \\ u_{o_y} \\ u_{o_z} \end{bmatrix} \cdot \underbrace{\begin{bmatrix} s_x v_1^T \dot{q} \\ s_y v_2^T \dot{q} \\ s_z v_3^T \dot{q} \\ s_{o_x} v_4^T \dot{q} \\ s_{o_y} v_5^T \dot{q} \\ s_{o_z} v_6^T \dot{q} \end{bmatrix}}_{scalar}$$

$u_i$: row vector
$v_i$: column vector

When singular value decomposition of the Jacobian matrix, from which the row vector corresponding to the direction of the x-axis is deleted, is carried out using Equation 6, the final column vector $v_6$ in the V matrix becomes the unit vector in the joint space corresponding to the direction of the x-axis. Further, when singular value decomposition of the Jacobian matrix, from which a row vector $\dot{y}$ corresponding to the direction of the y-axis, a row vector $\dot{z}$ corresponding to the direction of the z-axis, a row vector $w_x$ corresponding to the angular velocity in the direction of the x-axis, a row vector $w_y$ corresponding to the angular velocity in the direction of the y-axis, or a row vector $w_z$ corresponding to the angular velocity in the direction of the z-axis is deleted, is carried out, the final column vector $v_6$ in the V matrix becomes the unit vector in the joint space corresponding to each direction.

When the final column vector of the V matrix calculated by carrying out singular value decomposition of the Jacobian matrix, from which the row vector $\dot{x}$ corresponding to the direction of the x-axis is deleted through the above method, is referred to as $v_x$, collision avoidance contribution $e_x$ of an operating for movement in the direction of the x-axis is obtained by Equation 7 below.

$$e_x = \|v_x^T r\| \quad \text{Equation 7}$$

Here, $v_x^T$ denotes the transition matrix of the $v_x$ matrix.

The collision avoidance DOF calculation unit 230 calculates collision avoidance contributions of the operating DOFs having the same priority through the above-descried method, and calculates a DOF or DOFs having a high collision avoidance contribution so as to avoid collision with the obstacle. If the plural DOFs having the same priority have the same collision avoidance contribution, any DOF of the plural DOFs may be used to avoid collision with the obstacle. As the DOF has a high value of collision avoidance contribution, the DOF greatly contributes to collision avoidance.

If it is judged that the DOF for movement in the direction of the x-axis among the operating DOFs has the highest collision avoidance contribution, the collision avoidance DOF calculation unit 230 calculates a solution minimizing the norm $\|\dot{q}\|$ of $\dot{q}$, i.e., the minimum norm solution, among several solutions satisfying the trajectory of the vector z of the operating hand 18 by applying the pseudo-inverse $J^\#$ of the Jacobian matrix to the z matrix, from which a component in the direction of the x-axis is removed.

The minimum norm solution minimizing the norm $\|\dot{q}\|$ of $\dot{q}$ among several solutions satisfying the trajectory of the vector z of the operating hand 18 is obtained by Equation 8 below.

$$\dot{x} = \quad \text{Equation 8}$$
$$J\dot{q} \Rightarrow J^T \dot{x} = \underbrace{J^T J}_{invertible} \dot{q} \Rightarrow \dot{q} = (J^T J)^{-1} J^T \dot{x} = \underbrace{J^\# \dot{x}}_{minimum\ norm\ solution}$$

Since a solution of the inverse-kinematics is obtained even by adding a joint motion not affecting the operation to the minimum norm solution minimizing the norm $\|\dot{q}\|$ obtained by Equation 8, the collision avoidance DOF calculation unit 230 calculates a joint angular velocity $\dot{q}$ by Equation 9 below, and the manipulator 1 is operated based on the calculated joint angular velocity $\dot{q}$, thus avoiding collision with the obstacle.

$$\dot{q} = J^\# \dot{x} + (I - J^\# J)\nabla h(q) \quad \text{Equation 9}$$

Here, $\dot{q}$ is a joint angular velocity, $J^\# \dot{x}$ is the minimum norm solution, $(I - J^\# J)$ is a null space projection matrix, $h(q)$ is an objective function representing the shortest distance from the manipulator 1 to the obstacle, and $\nabla h(q)$ is a gradient of the objective function $h(q)$ representing a direction in which the shortest distance between the manipulator 1 and the obstacle in the joint space increases.

In Equation 9, $J^\# \dot{x}$ represents a motion excluding use of the DOF having the lowest priority (for example, movement in the direction of the z-axis) among the operating DOFs, i.e., a motion to maintain the original operation, and $(I - J^\# J)\nabla h(q)$ represents a motion to avoid collision with the obstacle using the DOF having the lowest priority.

The joint control unit 240 controls the joint driving unit 250 so as to perform a collision avoidance motion on the joint motion $J^\# \dot{x}$ due to the minimum norm solution minimizing the norm $\|\dot{q}\|$ of $\dot{q}$ among several solutions satisfying the trajectory of the vector $\dot{x}$, obtained by Equation below 9, and the joint motion $(I - J^\# J)\nabla h(q)$ not affecting the operation of the operating hand 18. With reference to FIGS. 6A and 6B, it is understood that the joint control unit 240 moves the operating hand 18 in a direction (d<d') in which the shortest distance d between the manipulator 1 and the obstacle increases, and the collision avoidance contribution means a degree of contributing to movement in the direction in which the shortest distance d between the manipulator 1 and the obstacle increases.

Further, the joint control unit 240 firstly uses the DOF having the lowest priority so as to avoid collision with the obstacle, if the collision avoidance motion is performed by driving the joints according to an order of priority for the operation. That is, the joint control unit 240 sequentially uses the DOFs from the DOF having the lowest priority to the DOF having the highest priority to perform a collision avoidance motion.

The collision avoidance DOF calculation unit 230 sets all the DOFs to be DOFs to avoid the collusion with the obstacle, if it is judged that the manipulator 1 is not capable of avoiding collision with the obstacle using some DOFs among the operating DOFs. Here, the joint control unit 240 stops the operation, avoids collision with the obstacle using all the DOFs, and then restarts the operation.

Figure 7:
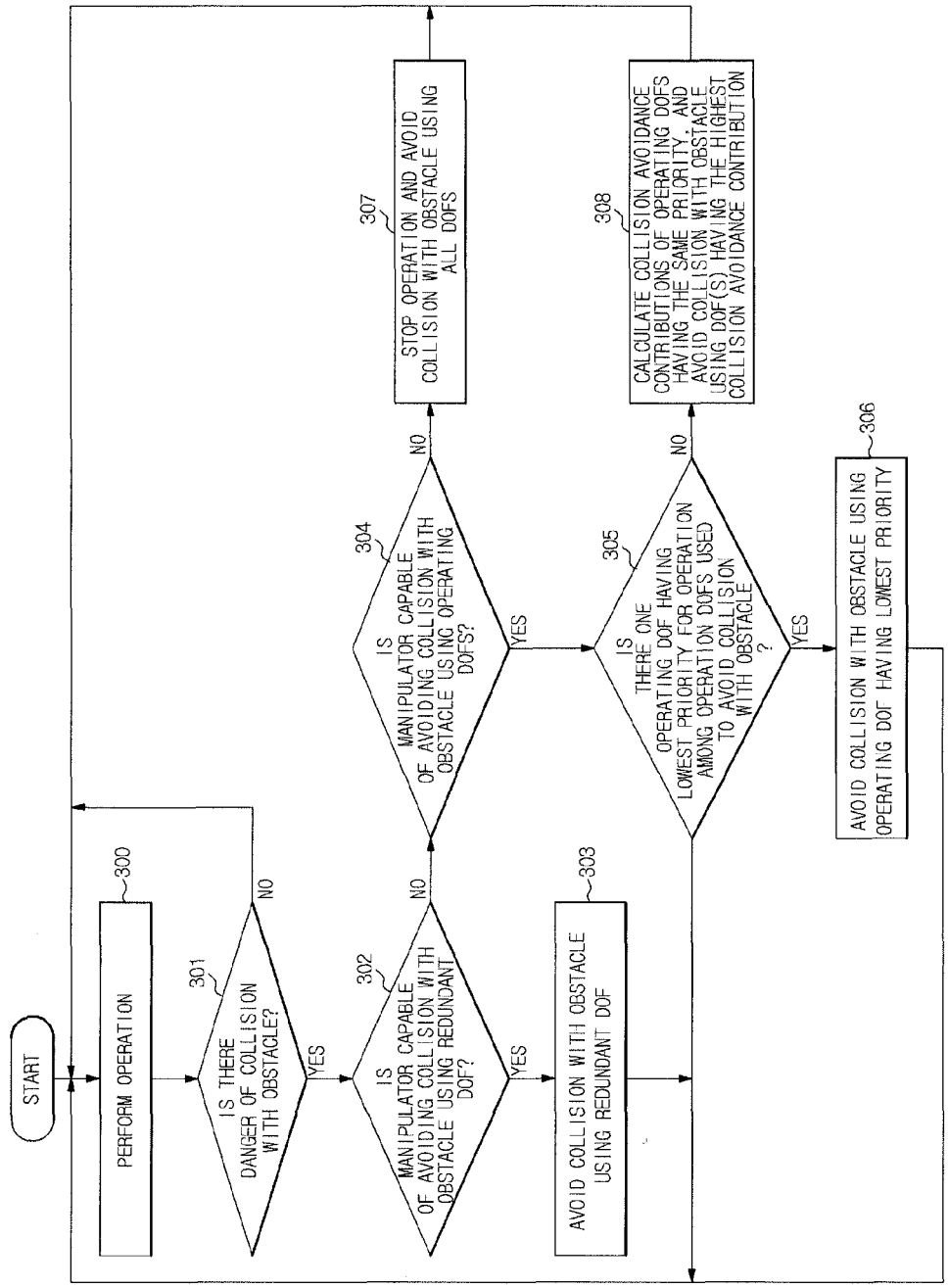
FIG. 7 is a flow chart of a control method of a manipulator to avoid collision with an obstacle in accordance with one embodiment.

FIG. 7 is a flow chart of a control method of a manipulator to avoid collision with an obstacle in accordance with one embodiment.

As shown in FIG. 7, the collision danger calculation unit 220 judges that there is danger (or risk) of collision of the manipulator 1 with the obstacle while performing an operation of the manipulator 1. The operation of the manipulator 1 means an operation which is designed in advance, such as an operation of carrying a cup or a welding operation. The collision danger calculation unit 220 judges that there is danger (or risk) of collision of the manipulator 1 with the obstacle, if the obstacle approaches the manipulator 1 within a designated distance or the obstacle is located within a designated distance in a traveling direction of the manipulator 1. Here, the collision danger calculation unit 220 judges whether or not the obstacle approaches the manipulator 1 using absolute coordinate positions of the respective joints and the operating hand 18 of the manipulator 1 calculated by the current position calculation unit 200 and three-dimensional position data of the obstacle transmitted from the sensor unit 210 (operations 300 and 301).

Thereafter, the collision avoidance DOF calculation unit 230 judges whether or not the manipulator 1 is capable of avoiding collision with the obstacle using a redundant DOF, if it is judged that there is danger (or risk) of the collision of the manipulator 1 with the obstacle. The collision avoidance DOF calculation unit 230 judges whether or not the manipulator 1 is capable of avoiding the collusion with the obstacle using only the motion of the wrist joint 14, which is the redundant DOF, without stopping the operation based on a rotating angle and a rotating radius of the wrist joint 14 (operation 302).

Thereafter, if it is judged that the manipulator 1 is capable of avoiding collision with the obstacle using the redundant DOF, the collision avoidance DOF calculation unit 230 transmits the data to the joint control unit 240, and the joint control unit 240 drives the joint driving unit 250 so as to perform a collision avoidance motion using the redundant DOF (operation 303).

On the other hand, if it is judged that the manipulator 1 is not capable of avoiding collision with the obstacle using the redundant DOF, the collision avoidance DOF calculation unit 230 judges whether or not the manipulator 1 is capable of avoiding collision with the obstacle using some DOFs among the operating DOFs (operation 304).

Thereafter, if it is judged that the manipulator 1 is capable of avoiding collision with the obstacle using some DOFs among the operating DOFs, the collision avoidance DOF calculation unit 230 judges whether or not there is one DOF having the lowest priority among the operating DOFs. Here, an order of priority is set by a designer when operations of the manipulator 1 are designed. For example, if the operation of the manipulator 1 is an operation of carrying a cup, the DOF for rotation around the x-axis and the DOF for rotation around the y-axis may be set to have the highest priority (operation 305).

Thereafter, if it is judged that there is one DOF having the lowest priority among the operating DOFs, the collision avoidance DOF calculation unit 230 sets the DOF having the lowest priority to be a DOF used to avoid collision with the obstacle. Then, the joint control unit 240 drives the joint driving unit 250 so as to avoid collision with the obstacle using the DOF having the lowest priority (operation 306).

On the other hand, if it is judged that there are plural DOFs having the lowest priority among the operating DOFs, the collision avoidance DOF calculation unit 230 calculates collision avoidance contributions of the DOFs having the same priority, and then selects a DOF or DOFs having the highest collision avoidance contribution. The joint control unit 240 drives the joint driving unit 250 so as to avoid collision with the obstacle using the DOF(s) having the highest collision avoidance contribution (operation 308).

Further, if it is judged that the manipulator 1 is not capable of avoiding collision with the obstacle using some DOFs among the operating DOFs during operation 304, the joint control unit 240 stops the operation, avoids collision with the obstacle using all of the redundant DOF and the operating DOFs, and then restarts the operation (operation 307).

Although the above embodiment illustrates the manipulator 1 having a redundant DOF and operating DOFs, the embodiment may be applied to a manipulator having only operating DOFs. In this case, a collision avoidance motion using the redundant DOF is excluded, and a collision avoidance motion may be performed through a control method using only the operating DOFs.

As is apparent from the above description, a manipulator in accordance with one embodiment calculates DOFs used to avoid collision with an obstacle in consideration of an order or priority and collision avoidance contribution, thereby capable of avoiding collision with the obstacle while maintaining durability and consistency of an operation.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on a computer-readable media, e.g., a non-transitory or persistent computer-readable medium. The program/software implementing the embodiments may also be transmitted over a transmission communication path, e.g., a network implemented via hardware. Examples of the non-transitory or persistent computer-readable media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A control method of a manipulator having a plurality of operating degrees of freedom (DOFs) used in an operation, comprising:
 judging whether there is danger of collision of the manipulator with an obstacle;
 judging whether there is at least one operating DOF capable of avoiding collision with the obstacle among the plurality of operating DOFs using a calculating unit including a processor, upon judging that there is danger of collision with the obstacle; and
 avoiding collision with the obstacle firstly using at least one operating DOF having the lowest priority while performing the operation among the at least one operating DOF capable of avoiding collision with the obstacle, upon judging that there is the at least one operating DOF capable of avoiding collision with the obstacle.

2. The method according to claim 1, wherein the manipulator includes at least one redundant DOF provided in addition to the operating DOFs, further comprising:
 judging whether the manipulator is capable of avoiding collision with the obstacle using only the at least one redundant DOF, upon judging that there is danger of collision with the obstacle; and
 avoiding collision with the obstacle using only the at least one redundant DOF, upon judging that the manipulator is capable of avoiding collision with the obstacle using only the at least one redundant DOF.

3. The method according to claim 2, further comprising judging whether there is at least one operating DOF capable of avoiding collision with the obstacle among the plurality of operating DOFs, upon judging that the manipulator is not capable of avoiding collision with the obstacle using only the at least one redundant DOF, and then avoiding collision with the obstacle using the at least one operating DOF capable of avoiding collision with the obstacle.

4. The method according to claim 3, further comprising stopping the operation and avoiding collision with the obstacle using all of the operating DOFs and the at least one redundant DOF, upon judging that the manipulator is not capable of avoiding collision with the obstacle using only the at least one redundant DOF and upon judging that there is not at least one operating DOF capable of avoiding collision with the obstacle among the plurality of operating DOFs.

5. The method according to claim 1, wherein the avoidance of collision with the obstacle using the at least one operating DOF having the lowest priority while performing the operation among the at least one operating DOF capable of avoiding collision with the obstacle includes, if there is one operating DOF having the lowest priority while performing the operation among the at least one operating DOF capable of avoiding collision with the obstacle, avoiding collision with the obstacle using the operating DOF having the lowest priority.

6. The method according to claim 1, wherein the avoidance of collision with the obstacle using the at least one operating DOF having the lowest priority while performing the operation among the at least one operating DOF capable of avoiding collision with the obstacle includes, if there is a plurality of operating DOFs having the lowest priority while performing the operation among the at least one operating DOF capable of avoiding collision with the obstacle, avoiding collision with the obstacle firstly using an operating DOF having the highest collision avoidance contribution among the plurality of operating DOFs having the lowest priority.

7. The method according to claim 6, wherein the collision avoidance contribution is obtained by calculating the shortest distance between the manipulator and the obstacle and judging a degree of increasing the shortest distance.

8. The method according to claim 1, wherein the judgment as to whether or not there is danger of the collision of the manipulator with the obstacle includes calculating absolute coordinates of joints of the manipulator, calculating a three-dimensional position coordinate of the obstacle, and judging whether or not the manipulator and the obstacle are located within a designated distance.

9. A manipulator having a plurality of operating degrees of freedom (DOFs) used in an operation and at least one redundant DOF provided in addition to the operating DOFs, comprising:
 a current position calculation unit to calculate angles of joints of the manipulator and to calculate absolute coordinates of the joints from the angles of the joints;
 a sensor unit to calculate a three-dimensional position coordinate of an obstacle around the manipulator;
 a collision danger calculation unit to judge whether or not there is danger of collision of the manipulator with the obstacle based on the absolute coordinates of the joints and the three-dimensional position coordinate of the obstacle;
 a collision avoidance DOF calculation unit to judge whether the manipulator is capable of avoiding collision with the obstacle using only the at least one redundant DOF, upon judging that there is danger of collision with the obstacle, to judge whether the manipulator is capable of avoiding collision with the obstacle using the operating DOFs, upon judging that the manipulator is not capable of avoiding collision with the obstacle using only the at least one redundant DOF, and to calculate at least one operating DOF having the lowest priority while performing the operation among at least one operating DOF capable of avoiding collision with the obstacle, upon judging that there is the at least one operating DOF capable of avoiding collision with the obstacle; and
 a joint control unit to control the joints so as to avoid collision with the obstacle using the calculated at least one operating DOF.

10. The manipulator according to claim 9, wherein the collision avoidance DOF calculation unit, if there is one operating DOF having the lowest priority while performing the operation among the at least one operating DOF capable of avoiding collision with the obstacle, avoids collision with the obstacle using the operating DOF having the lowest priority.

11. The manipulator according to claim 9, wherein the collision avoidance DOF calculation unit, if there is a plurality of operating DOFs having the lowest priority while performing the operation among the at least one operating DOF capable of avoiding collision with the obstacle, avoids collision with the obstacle firstly using an operating DOF having the highest collision avoidance contribution among the plurality of operating DOFs having the lowest priority.

12. The manipulator according to claim 11, wherein the collision avoidance DOF calculation unit calculates the DOF having the highest collision avoidance contribution among the plurality of operating DOFs having the lowest priority by calculating the shortest distance between the manipulator and the obstacle and judging a degree of increasing the shortest distance.

13. The manipulator according to claim 9, wherein the collision avoidance DOF calculation unit sets all of the operating DOFs and the at least one redundant DOF as DOFs to avoid collision with the obstacle, upon judging that the manipulator is not capable of avoiding collision with the obstacle using only the at least one redundant DOF and upon judging that there is not at least one operating DOF capable of avoiding collision with the obstacle among the plurality of operating DOFs.

14. A control method of a manipulator having a plurality of operating degrees of freedom (DOFs) used in an operation, comprising:
   avoiding collision of the manipulator with an obstacle using at least one operating DOF having a lowest priority among the operating DOFs capable of avoiding collision with the obstacle while performing the operation using a calculating unit including a processor.

15. At least one non-transitory computer-readable medium storing computer-readable instructions to control at least one processor to implement the method of claim 14.

16. A manipulator having a plurality of operating degrees of freedom (DOFs) used in an operation, comprising:
   a calculating unit including a processor determining at least one operating DOF having a lowest priority among the operating DOFs capable of avoiding collision of the manipulator with an obstacle while performing the operation.

* * * * *

UNITED STATES PATENT AND TRADEMARK OFFICE
CERTIFICATE OF CORRECTION

| | | |
|---|---|---|
| PATENT NO. | : 8,606,402 B2 | Page 1 of 1 |
| APPLICATION NO. | : 13/004515 | |
| DATED | : December 10, 2013 | |
| INVENTOR(S) | : Lee et al. | |

It is certified that error appears in the above-identified patent and that said Letters Patent is hereby corrected as shown below:

In the Specification

Column 1, Line 8, delete "No," and insert -- No. --, therefor.

In the Claims

Column 12, Line 4, in Claim 8, after "whether" delete "or not".
Column 12, Line 8, in Claim 8, after "whether" delete "or not".

Signed and Sealed this
Twenty-second Day of July, 2014

Michelle K. Lee
*Deputy Director of the United States Patent and Trademark Office*